United States Patent
Mantegna et al.

(10) Patent No.: US 7,281,053 B2
(45) Date of Patent: Oct. 9, 2007

(54) METHOD AND SYSTEM FOR DYNAMIC LATENCY MANAGEMENT AND DRIFT CORRECTION

(75) Inventors: John Mantegna, Potomac Falls, VA (US); Shuwu Wu, Foothill Ranch, CA (US)

(73) Assignee: AOL LLC, Dalles, VA (US)

( * ) Notice: Subject to any disclaimer, the term of this patent is extended or adjusted under 35 U.S.C. 154(b) by 1012 days.

(21) Appl. No.: 09/845,083

(22) Filed: Apr. 30, 2001

(65) Prior Publication Data

US 2002/0046288 A1   Apr. 18, 2002

Related U.S. Application Data

(60) Provisional application No. 60/239,917, filed on Oct. 13, 2000.

(51) Int. Cl.
*H04J 3/06*   (2006.01)

(52) U.S. Cl. .................. 709/231; 709/246; 710/56; 370/516

(58) Field of Classification Search .......... 709/200, 709/221, 225, 246, 231; 713/401, 503; 375/356, 375/371; 710/53, 56, 52, 57; 704/500, 502; 370/516
See application file for complete search history.

(56) References Cited

U.S. PATENT DOCUMENTS

| | | | |
|---|---|---|---|
| 5,825,771 A * | 10/1998 | Cohen et al. | 370/394 |
| 5,848,134 A | 12/1998 | Sekiguchi et al. | |
| 6,212,206 B1 * | 4/2001 | Ketcham | 370/516 |
| 6,377,931 B1 * | 4/2002 | Shlomot | 704/503 |
| 6,452,950 B1 * | 9/2002 | Ohlsson et al. | 370/516 |
| 6,665,317 B1 | 12/2003 | Scott | |
| 6,665,728 B1 * | 12/2003 | Graumann et al. | 709/232 |
| 6,683,889 B1 * | 1/2004 | Shaffer et al. | 370/516 |
| 6,862,298 B1 * | 3/2005 | Smith et al. | 370/516 |

FOREIGN PATENT DOCUMENTS

| | | | |
|---|---|---|---|
| EP | 0921666 A2 * | 12/1997 | |
| EP | 0921666 | 6/1999 | |
| EP | 0987894 | 3/2000 | |
| WO | WO9522233 | 8/1995 | |
| WO | WO 00/60809 | 10/2000 | |

OTHER PUBLICATIONS

Hodson, O., Perkins, C., Hardman, V. "Skew detedction and compensation for Internet audio applications" ICME 2000, Jul. 2000, vol. 3, pp. 1687-1690.*

* cited by examiner

*Primary Examiner*—Saleh Najjar
*Assistant Examiner*—David Lazaro
(74) *Attorney, Agent, or Firm*—Fish & Richardson P.C.

(57) ABSTRACT

Latency in a real-time electronic communication is dynamically managed. A communication delay arising from a receiving data buffer is measured and a latency adjustment necessary to adjust the size of the communication delay to within a predetermined range and an optimal range for a size of the communication delay are determined. Using these parameters, the number of samples for an audio playback data block passing through the receiving data buffer is modified.

29 Claims, 4 Drawing Sheets

METHOD AND SYSTEM FOR DYNAMIC LATENCY MANAGEMENT AND DRIFT CORRECTION

CROSS-REFERENCE TO RELATED APPLICATIONS

This application is a non-provisional application that claims priority to U.S. application Ser. No. 60/239,917, filed on Oct. 13, 2000, which is incorporated herein by reference.

TECHNICAL FIELD

The subject matter relates to the electronic communication of data.

BACKGROUND

In real-time electronic communication, an important measure of quality is the length of time between sending data and the beginning of the actual playback of the data. The delay between the transfer of data from a remote source and the rendering of data is often known as end-to-end communication latency. Communication latency may affect both one-way communication, such as server-to-terminal streaming, and multipoint communication, such as Internet telephony.

Latency may interfere with true real-time communication by requiring the receiver of a communication to delay playback of the communication. In addition, data buffers may be required to store an advance supply of data to compensate for momentary transmission or processing delays. Some non-zero latency, however, may be tolerable and even necessary in real-time communication systems. For example, a small latency may be useful to compensate for physical constraints of some communication systems. Optimizing latency generally provides a better communication experience for the user.

Latency may result from a variety of sources, including audio recording buffer delay, transmission delay, receiving data buffer delay, and playback delay. Various transient conditions experienced during the communication setup and start/stop operations in both half-duplex and full-duplex modes may cause the receiving buffer delay to differ from an optimal delay. Start/stop operations generally are necessary even for full-duplex operations in order to use available bandwidth efficiently. For example, some systems use a voice detection algorithm to determine when to start and stop sending voice data packets.

In real-time audio communications that use a packet-switched internet, network-introduced latency is generally variable and unpredictable. This results in difficulties in predetermining an optimal size for a receiving data buffer that accommodates all situations.

The determination of an optimal size for a receiving data buffer may be further complicated by a temporal drift that may exist between the asynchronous recording and playback devices operating at different recording/playback speeds. This temporal drift may cause either steady buildup or steady depletion of the receiving data buffer, which, in turn, may result in the actual latency in a communication deviating from an optimal latency.

SUMMARY

In one general aspect, latency in a real-time electronic communication is dynamically managed. A communication delay arising from a receiving data buffer is measured and a latency adjustment necessary to adjust the size of the communication delay to within a predetermined range and an optimal range for a size of the communication delay are determined. Using these parameters, the number of samples for an audio playback data block passing through the receiving data buffer is increased or decreased.

Implementations may include one or more of the following features. For example, the number of samples may be modified without introducing audible artifacts. An instantaneous communication delay associated with the receiving data buffer may be measured, and, if measured multiple times, may be averaged over a time period. A number of samples to be inserted in or removed from the playback data block may be calculated and receiving data buffer delay upper and lower bounds may be determined.

Heuristic resampling of the audio playback data block may be performed. When heuristic resampling is performed, multiple consecutive samples of audio data in an audio buffer may be analyzed, consecutive samples with minimal variation in a parameter of their data may be identified, and the number of samples in the identified consecutive samples may be adjusted. A sample may be removed from or added to the identified consecutive samples.

The details of one or more implementations are set forth in the accompanying drawings and the description below.

DETAILED DESCRIPTION

Figure 4:
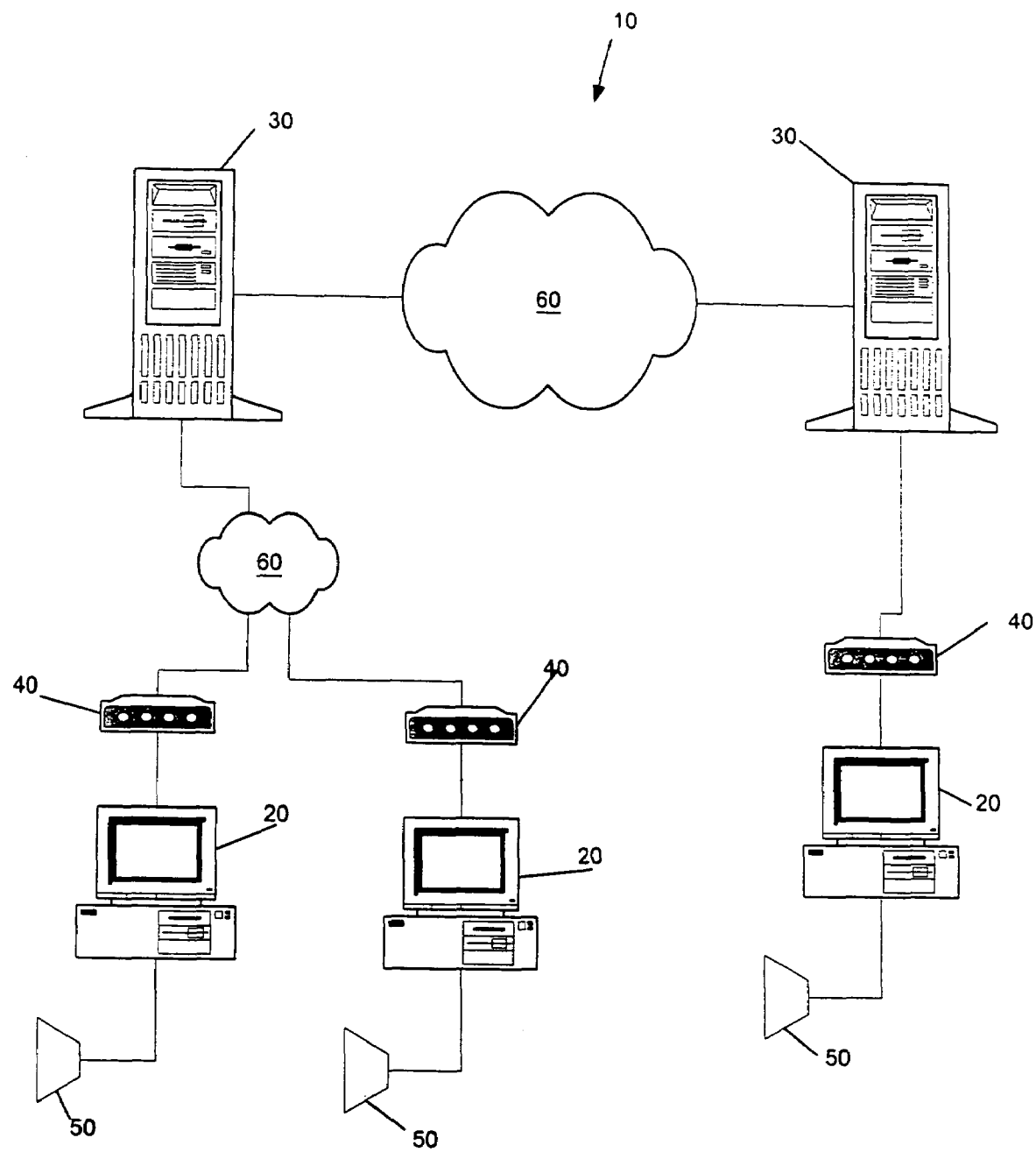
FIG. 4 is a block diagram illustrating an exemplary electronic communication system capable of achieving dynamic latency management, temporal drift correction and/or automatic microphone detection based on the processes described in FIGS. 1-3.

Referring to FIG. 4, an electronic communications system 10 capable of achieving dynamic latency correction, temporal drift correction and/or microphone detection is described. System 10 may include multiple computer systems, which may be client systems 20, connected together, either directly or through one or more server systems 30. Client systems may connect to server systems through a link 40 (e.g a modem a direct connection. Connections among multiple systems, whether client systems 20 or server systems 30, may form a network 60 (for example, an intranet, an internet (e.g., the Internet), a wide area network (WAN), a local area network (LAN), analog or digital wired and wireless telephone networks (for example, PSTN, ISDN, and xDSL)). Client systems and server systems 20 or 30 may exchange electronic data, such as, for example, audio data through the networks to which they are connected. Electronic data may be temporarily stored and preprocessed by a playback buffer when it is received by a computer system. Data received by a computer system may be played back either directly by the computer system, or on a peripheral device 50 connected to the system, such as, for example, as speaker for playing back audio data.

Dynamic Latency Correction

Figure 1:
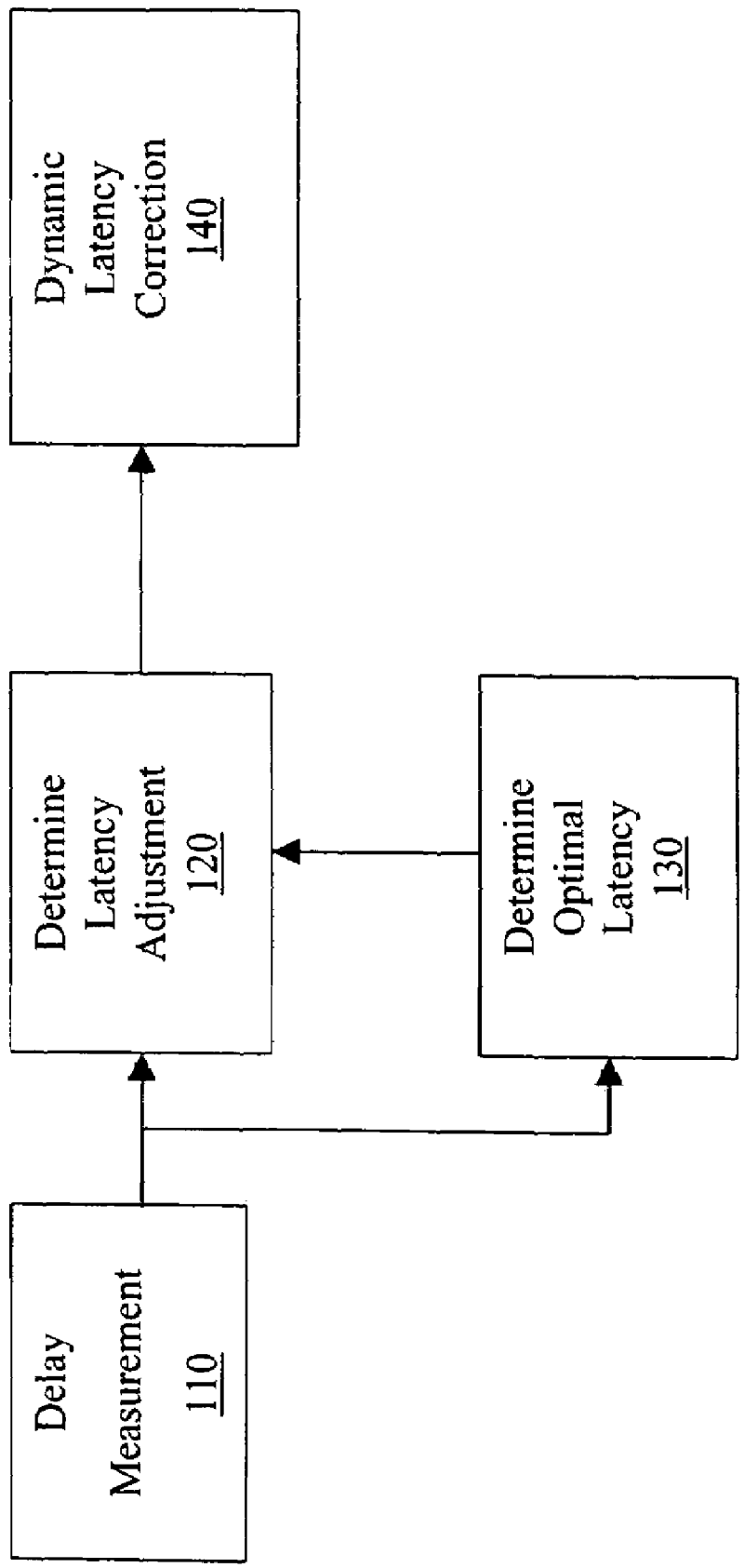
FIG. 1 is a flow chart illustrating an exemplary process for managing dynamic latency.

Referring to FIG. 1, dynamic latency management in a real-time electronic communications system may be achieved by determining the amount of data stored by the receiving data buffer (step 110), determining a latency correction amount with which to improve or optimize the communications link in the system (step 120), determining the target or optimal latency for the communications link (step 130), and adjusting the latency (step 140). A dynamic latency management system also may automatically correct temporal drifts that may exist in the communication link.

The amount of data stored in a buffer between receiving and playback circuitry may be indicative of delays or latencies introduced in a real-time communications system. Determining the amount of delay (step 110) based on the amount of data stored in the receiving data buffer (hereinafter, the buffer size) is a non-trivial matter in real-time audio communication systems, since the size of the buffer tends to fluctuate constantly during communication. That is, the size of the receiving buffer may fluctuate as data pass through the buffer because the data buffer size is generally determined by a relationship between two asynchronous processes—receiving data from the network and outputting data for playback. For applications involving unpredictable and jittery communication links (e.g., Internet telephony connections), snapshot measurements of the receiving data buffer size can vary greatly from one measurement to another. At least the latency due to buffer delays may be exacerbated in Internet-telephony applications over packet-switched networks, which generally require a substantial receiving data buffer delay to absorb transmission jitter.

Since audio playback data generally are stored in equal size blocks before latency correction, and since latency correction typically is small, near-periodic playback hardware interrupts may be used to measure the data buffer size. The buffer delay may be measured either periodically or near-periodically over a fixed temporal window (TW1) and then averaged over TW1. This averaging reduces the effects of transient network jitter and other conditions that otherwise result in transient fluctuations in the data buffer delay. The size of TW1 generally is small enough to reduce and/or minimize the amount of time required to perform dynamic latency management, yet generally is large enough to achieve the desired delay measurement accuracy. Thus, the buffer delay may be determined without requiring that the data packets be time-stamped.

To determine the amount by which latency must be adjusted (step 120), the average measured data buffer is compared to the target or optimal latency as defined by settable upper and lower bounds of the buffer delay. When the measured delay is out-of-bounds, the size of some or all of the stored data blocks may be adjusted to correct the latency or drift. Specifically, a non-zero latency adjustment may be calculated based on the amount of data samples to be inserted or removed from the data buffer or future data blocks to bring the delay or drift within bounds, and a subsequent correction then may be made. For example, the adjustment amount may be determined by multiplying the number of out-of-bounds samples by an empirically determined convergent factor. The adjustment amount may be normalized (e.g., by dividing by the nominal number of audio playback blocks in the audio buffer) to represent the number of samples to be inserted in or removed from each audio playback block.

An example of the process of determining the latency adjustment is illustrated below, as implemented using the following exemplary computer program:

If (AD>delay upper bound)
        OBS=AD−(delay upper bound)
    If (AD<delay lower bound)
        OBS=AD−(delay lower bound)
    Else
        OBS=0.0
    LD=CF*OBS/Nb, where AD is the average measured delay in terms of samples, OBS is the number of out-of-bounds samples, CF is the convergent factor (the absolute value of which is greater than 1.0 to ensure convergence), Nb is the number of nominal audio playback blocks in the received data buffer, and LD is the latency adjustment in terms of the number of samples to be inserted or removed for each audio playback block (LD is positive if samples are to be removed and negative if samples are to be inserted).

For a given real-time audio communication link, it is possible to select an optimal operating range for the data buffer delay (i.e., optimal upper and lower bounds for the buffer delay) that theoretically permits communication with minimal delay, while simultaneously taking account of latency and drift in the link. Therefore, a predetermined optimal operating range may be used continuously. However, due to variations encountered in actual communication links, a predetermined optimal operating range may differ from the actual optimal operating range for a particular active communication link.

Therefore, rather than continuously using a predetermined optimal operating range, an optimal operating range may be determined (step 130) based on actual delays in the communication link that are measured over a time window (TW2) that is long enough to capture the complete cycle of high-to-low fluctuations in data buffer size. Multiple measured data buffer delays then may be used to determine the range of the delay fluctuations. Individual measured delays that are all substantially above zero indicate that the current upper and lower delay bounds are generally too high and should be decreased to reduce overall communication latency in the link. The measurement of zero delays during TW2 indicates that the upper and lower bounds should be increased to avoid communication gaps. In this manner, the difference between the upper bound and the lower bound is maintained at a level that is related to transient fluctuations of the data buffer delay. The modified upper and lower bounds then are used in the subsequent latency adjustment. Since this algorithm typically is used in conjunction with dynamic latency correction, the time window TW2 generally is greater than the time window TW1 used in the delay measurement.

In general, dynamic latency correction (step 140) is used to correct for any initial-condition-induced latency offset, intermediate periodic swings in latency, and/or long-term temporal drift, so that system latency is dynamically adjusted and maintained within the optimal range. Based on the number of samples to be inserted or removed, some or all of the stored or incoming audio playback blocks are modified, the size of each playback block is modified, and/or the number of playback blocks per defined period of time is modified. For example, a heuristic resampling technique may be applied to inaudibly insert or remove a specified number of samples from each audio playback block before the audio data are played back. Rather than using various stages of interpolation, decimation, and filtering, heuristic resampling exploits waveform properties to inaudibly insert or remove a small percentage of the samples. Although many possible implementations of heuristic resampling are possible, a simple exemplary implementation is provided to illustrate an application of this technique to speech samples. For example, groups of multiple consecutive samples (e.g., three) may be examined throughout the audio buffer. When an examined group of samples (e.g., three) is found to have minimal variance, the middle sample may be repeated to add a sample or deleted to subtract a sample. Upsampling preprocessing and downsampling postprocessing also may be used with heuristic resampling techniques to minimize audible artifacts in non-speech audio input.

Temporal Drift Correction

The above-described management of dynamic latency may be used to automatically correct general temporal drift occurring in a real-time audio communication system. More specialized techniques may be used to address specialized cases of temporal drift, such as for example, the case of a persistent temporal drift in a real-time audio communication system. Internet telephony may be especially sensitive to the effects of latency and drift, each of which may interfere with a user's ability to experience coherent spoken interaction. Due to the large number of manufacturers of different computer sound subsystems with varying temporal accuracy, the clocks used by two different sound subsystems may develop a large relative drift over time. Thus, a communication recorded by one device and played back by another device may experience a temporal drift. Without correction, the temporal drift may build up indefinitely, or may completely deplete the receiving data buffer, neither of which are acceptable conditions in a real-time communication system.

Figure 2:
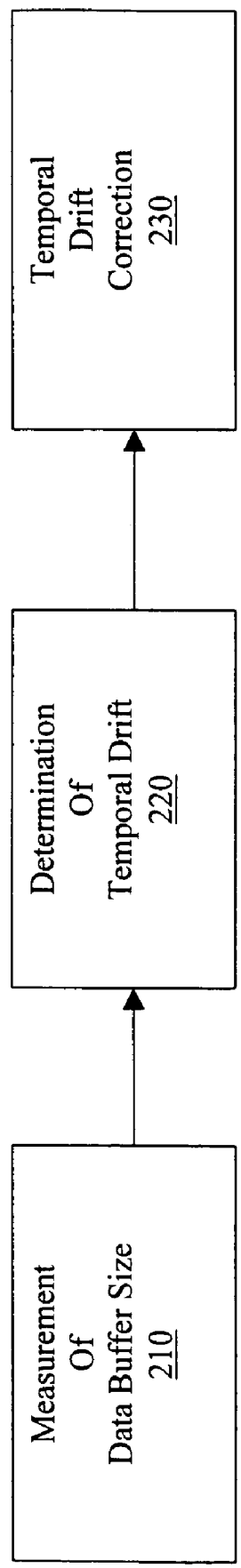
FIG. 2 is a flow chart illustrating an exemplary process for correcting temporal drift.

Referring to FIG. 2, a persistent temporal drift may be corrected by measuring the data buffer size (step 210), determining the amount of temporal drift (step 220), and correcting the temporal drift (step 230).

The measurement of the average receiving data buffer size (step 210) shares many aspects with the delay measurement (step 110) described above, in that the size of the delay buffer is measured multiple times over a time window and then averaged. To determine the temporal drift, the measured average buffer size for each playback block is compared to a predetermined nominal data buffer size. Then the temporal drift for each audio playback block is determined based on the difference in size divided by the nominal number of blocks in the data buffer. When multiplied by a convergent factor, it is possible to express the temporal drift for each playback block as:

$TD[i]=CF*(AS[i]-Ns)/Nb, i=0, 1, 2, \ldots ,$ where i is an index referring to a playback block, AS[i] is the average data buffer size in samples for the $i^{th}$ playback block, TD[i] is the temporal drift for the it playback block, CF is a convergent factor greater than one, Ns is the nominal number of samples in the data buffer, and Nb is the number of nominal audio playback blocks in the data buffer. The temporal drift TD can be positive, zero, or negative. A positive value indicates that samples are to be removed, and a negative value indicates that samples are to be inserted. In general samples are inserted or removed on a block-by-block basis.

Once the amount of temporal drift is determined (step 220), it is used to determine the number of samples to be inserted or removed for each audio playback block (step 230). The techniques described above with respect to dynamic latency correction (step 140) may be applied to insert or remove an appropriate number of samples from some or all data blocks in order to correct temporal drift (step 230).

Automatic Microphone Detection

Real-time audio communication systems may include sound subsystems with a microphone to pick-up voice signals, which then may be processed and transmitted across a computer network. Most personal computer (PC) operating systems (e.g. Windows, Mac, and Linux) provide a mechanism to determine whether the sound subsystem is present and available for enabling communication using the audio communication system. In Internet telephony and real-time streaming applications, particularly those used by novices, it is sometimes necessary, but often difficult, to automatically determine whether a microphone has been properly connected to the sound subsystem.

Figure 3:
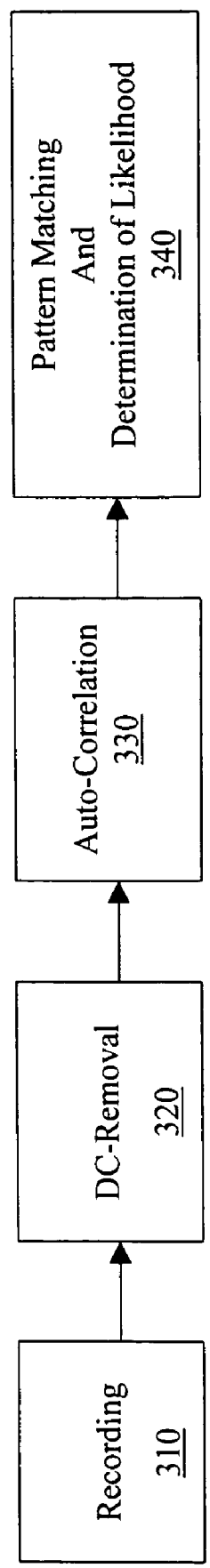
FIG. 3 is a flow chart illustrating an exemplary process for automatically detecting a microphone.

Referring to FIG. 3, a microphone that is electrically connected to a computer may be detected automatically by making a short recording (e.g., about 200 milliseconds) using the computer's operating system functions with the maximum recording gain setting (step 310), filtering out a DC component of the audio data (step 320), computing N1 through N2 taps of auto-correlation coefficients of the resulting audio data (step 330), and performing pattern recognition on the auto-correlation coefficients to detect the presence of an ambient AC signal and its harmonics (step 340).

When a microphone is properly connected, an audio recording typically records an AC signal and its harmonics from the computer's power supply and the ambient environment. When a microphone is not connected, the recorded audio data generally contains only random noise energy. Therefore, the pattern of the absolute value of its auto-correlation coefficients is highly dependent upon whether a microphone is properly connected. In the presence of an ambient AC signal and its harmonics, the pattern in the absolute value of the auto-correlation coefficients shows periodicity over tap delays with relative large amplitude and periods. Without the AC signal and its harmonics, the pattern is either random or pseudo-periodic with relatively small periodicity and small amplitude signals. A single figure of merit (FOM) based on the auto-correlation coefficients of a recorded signal that may be used to differentiate these two types of patterns may be expressed as:

$FOM=$(mean of $dac[i]$)/(maxAC−minAC),
$i=0, 1, \ldots , N2-N1-1,$ where AC[i] are auto-correlation coefficients of the recorded signal for i ranging from N1 to N2; ac[i] is the absolute value of (AC[i+N1]) for i ranging from 0 to N2−N1; dac[i] is the absolute value of (ac[i+1]−ac[i]) for i ranging from 0 to N2−N1−1; maxAC is the maximum of ac[i] for i ranging from 0 to N2−N1; and minAC is the minimum of ac[i] for i ranging from 0 to N2−N1.

The magnitude of a figure of merit (FOM) in the presence of an AC signal or its harmonics can be 5 to 10 times smaller than the magnitude of a FOM when an AC signal or its harmonics are not present. Therefore, the FOM serves as a good indicator of the two types of patterns to be discriminated, and the likelihood that a microphone is properly connected may be determined from the FOM.

The FOM of a system may be calibrated before the system is put into use, by determining the range of values for the FOM when a microphone is and is not connected to a computer. Once the computer system is installed, the value of the FOM may be automatically detected by the computer and used to determine whether or not a microphone is properly connected.

The techniques, methods, and systems described here may find applicability in a variety of computing or processing environments in which audio signals can be generated, copied, transmitted and played back or otherwise manipulated, and may be generalized to find applicability for the similar processing of video signals. Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system of one or more computers to operate on input and/or generate output in a specific and predefined manner. Such a computer system may include one or more programmable processors that receive data and instructions from, and transmit data and instructions to, a data storage system, and suitable input and output devices. Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, one or more processors will receive instructions and data from one or more read-only memories and/or one or more random access memories. Storage devices suitable for tangibly embodying computer instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

These elements also can be found in a conventional desktop or workstation computer as well as other computers suitable for executing computer programs implementing the methods described here, which can be used in conjunction with any software for rendering, manipulating or playing electronic communication data, including audio data. Any of the foregoing may be supplemented by, or implemented in, specially designed ASICs (application specific integrated circuits).

Other implementations are within the scope of the following claims.

What is claimed is:

1. A method for dynamic latency management in a real-time electronic communication comprising:
    measuring, at least twice, an instantaneous communication delay arising from a receiving data buffer;
    determining a communication delay by averaging the instantaneous communication delay measurements;
    selecting a time window defined based on a time necessary to capture a complete cycle of fluctuations in the receiving buffer;
    determining a working range for a communication delay by measuring and analyzing delays experienced during the selected time window, the working range including an upper and lower bound;
    comparing the determined communication delay with the working range for a communication delay;
    if, based on the comparison, the determined communication delay is determined to be outside the upper or lower bound of the working range, determining a latency adjustment necessary to adjust the size of the determined communication delay to within the working range; and
    modifying a number of samples of a playback data block passing through the receiving data buffer based on the latency adjustment determined to be necessary to adjust the size of the determined communication delay;
    wherein modifying the number of samples further comprises performing heuristic resampling of a playback block.

2. The method of claim 1 wherein the number of samples is modified without introducing audible artifacts.

3. The method of claim 1 wherein the real-time electronic communication includes an audio communication.

4. The method of claim 1 wherein performing heuristic resampling comprises:
    analyzing multiple consecutive samples of audio data in the playback block;
    identifying consecutive samples with minimal variation in a parameter of their data; and
    adjusting the number of samples in the identified consecutive samples.

5. The method of claim 4 wherein adjusting the number of samples comprises removing; a sample from the identified consecutive samples.

6. The method of claim 4 wherein adjusting the number of samples comprises adding a sample to the identified consecutive samples.

7. The method of claim 1 wherein determining a working range for a communication delay by measuring and analyzing delays experienced during the selected time window comprises:
    decreasing the upper and lower bounds of a prior working range conditioned on measuring no individual delay that exceeds a threshold amount during the selected time window; and
    increasing the upper and lower bounds of the prior working range conditioned on measuring no individual delays during the selected time window.

8. The method of claim 1 wherein selecting the time window includes selecting a time window that is long enough to capture a complete cycle of high-to-low fluctuations in the receiving data buffer.

9. The method of claim 8 wherein a complete cycle of high-to-low fluctuations in the receiving data buffer comprises a cycle that takes into account fluctuations in the data buffer size, the fluctuations being caused by a relationship between the asynchronous processes of receiving data from a source and outputting data for playback.

10. A computer program, residing on a computer-readable medium, for dynamically managing latency in a real-time electronic communication, comprising instructions for causing a computer to:
    measure, at least twice, an instantaneous communication delay arising from a receiving data buffer;
    determine a communication delay by averaging the instantaneous communication delay measurements;
    select a time window defined based on a time necessary to capture a complete cycle of fluctuations in the receiving buffer;
    determine a working range for a communication delay by measuring and analyzing delays experienced during the selected time window, the working range including an upper and lower bound;
    compare the determined communication delay with the working range for a communication delay;

if, based on the comparison, the determined communication delay is determined to be outside the upper or lower bound of the working range, determine a latency adjustment necessary to adjust the size of the determined communication delay to within the working range; and modify the number of samples of a playback data block passing through the receiving data buffer based on the latency adjustment determined to be necessary to adjust the size of the determined communication delay;

wherein instructions for causing a computer to modify the number of samples further comprise instructions for causing a computer to perform heuristic resampling of a playback block.

11. The computer program of claim 10 further comprising instructions for causing a computer to modify the number of samples without introducing audible artifacts.

12. The computer program or claim 10 wherein the real-time electronic communication includes an audio communication.

13. The computer program of claim 10 wherein instructions for causing a computer to perform heuristic resampling comprise instructions for causing a computer to:

analyze multiple consecutive samples of audio data in the playback block;

identify consecutive samples with minimal variation in a parameter of their data; and adjust the number of samples in the identified consecutive samples.

14. The computer program of claim 13 wherein adjusting the number of samples comprises removing a sample from the identified consecutive samples.

15. The computer program of claim 13 wherein adjusting the number of samples comprises adding a sample to the identified consecutive samples.

16. The computer program of claim 10 wherein the instructions for causing a computer to determine a working range for a communication delay by measuring and analyzing delays experienced during the selected time window comprise instructions for causing a computer to:

decrease the upper and lower bounds of a prior working range conditioned on measuring at least one individual delay that exceeds a threshold amount during the selected time window, and increase the upper and lower bounds of the prior working range conditioned on measuring no individual delays during the selected time window.

17. The computer program of claim 10 wherein the instructions for causing a computer to select the time window comprise instructions for causing a computer to select a time window that is long enough to capture a complete cycle of high-to-low fluctuations in the receiving data buffer.

18. The computer program of claim 17 wherein a complete cycle of high-to-low fluctuations in the receiving data butter comprises a cycle that takes into account fluctuations in the data buffer size, the fluctuations being caused by a relationship between the asynchronous processes of receiving data from a source and outputting data for playback.

19. A computer system running programmed processes comprising a process for dynamically managing latency in a real-time electronic communication, which process causes the computer system to:

measure, at least twice, an instantaneous communication delay arising from a receiving data buffer;

determine a communication delay by averaging the instantaneous communication delay measurements;

select a time window defined based on a time necessary to capture a complete cycle of fluctuations in the receiving buffer;

determine a working range for a communication delay by measuring and analyzing delays experienced during the selected time window, the working range including an upper and lower bound;

compare the determined communication delay with the working range for a communication delay;

if, based on the comparison, the determined communication delay is determined to be outside the upper or lower bound of the working range, determine a latency adjustment necessary to adjust the size of the determined communication delay to within the working range; and modify the number of samples of a playback data block passing through the receiving data buffer based on the latency adjustment determined to be necessary to adjust the size of the determined communication delay;

wherein the process that causes a computer system to modify the number of samples comprises a process that causes a computer system to perform heuristic resampling of a playback block.

20. The computer system of claim 19 wherein the number of samples is modified without introducing audible artifacts.

21. The computer system of claim 19 wherein the real-time electronic communication includes an audio communication.

22. The computer system of claim 19 wherein performing heuristic resampling comprises:

analyzing multiple consecutive samples of audio data in the playback block;

identifying consecutive samples with minimal variation in a parameter of their data; and adjusting the number of samples in the identified consecutive samples.

23. The computer system of claim 22 wherein adjusting the number of samples comprises removing a sample from the identified consecutive samples.

24. The computer system of claim 22 wherein adjusting the number of samples comprises adding a sample to the identified consecutive samples.

25. The computer system of claim 19 wherein process for dynamically managing latency that causes the computer system to determine a working range for a communication delay by measuring and analyzing delays experienced during the selected time window comprises a process for dynamically managing latency that causes the computer system to:

decrease the upper and lower bounds of a prior working range conditioned on measuring at least one individual delay that exceeds a threshold amount during the selected time window, and increase the upper and lower bounds of the prior working range conditioned on measuring no individual delays during the selected time window.

26. The computer system of claim 19 wherein the process for dynamically managing latency that causes the computer system to select the time window comprises a process for dynamically managing latency that causes the computer system to select a time window that is long enough to capture a complete cycle of high-to-low fluctuations in the receiving data buffer.

27. The computer system of claim 26 wherein a complete cycle of high-to-low fluctuations in the receiving data buffer comprises a cycle that takes into account fluctuations in the data buffer size, the fluctuations being caused by a relationship between the asynchronous processes of receiving data from a source and outputting data for playback.

28. A method for dynamic latency management in a real-time electronic communication comprising:

measuring, at least twice, an instantaneous communication delay arising from a receiving data buffer;

determining a communication delay by averaging the instantaneous communication delay measurements;

selecting a time window defined based on a tune necessary to capture a complete cycle of fluctuations in the receiving buffer;

determining a working range for a communication delay by measuring and analyzing delays experienced during the selected time window, the working range including an upper and lower bound;

comparing the determined communication delay with the working range;

making determinations related to latency adjustment based on the comparison; and modifying data passing through the receiving buffer based on the determinations related to latency adjustment.

29. The method of claim 28 wherein selecting the time window includes selecting a time window that is long enough to capture a complete cycle of high-to-low fluctuations in the receiving data buffer.

* * * * *